(12) United States Patent
Klapf et al.

(10) Patent No.: US 7,738,272 B2
(45) Date of Patent: Jun. 15, 2010

(54) CIRCUIT AND METHOD FOR RECTIFYING AND REGULATING VOLTAGES

(75) Inventors: Christian Klapf, Graz (AT); Guenter Hofer, St. Oswald (AT); Markus Auer, Graz (AT)

(73) Assignee: Infineon Technologies AG, Neubiberg (DE)

( * ) Notice: Subject to any disclaimer, the term of this patent is extended or adjusted under 35 U.S.C. 154(b) by 371 days.

(21) Appl. No.: 11/948,037

(22) Filed: Nov. 30, 2007

(65) Prior Publication Data

US 2009/0141518 A1 Jun. 4, 2009

(51) Int. Cl.
*H02M 7/08* (2006.01)
(52) U.S. Cl. .......................... 363/67; 363/127; 323/267
(58) Field of Classification Search .................. 363/55, 363/65, 67, 71–74, 126–127, 59; 323/282–288, 323/266–271
See application file for complete search history.

(56) References Cited

U.S. PATENT DOCUMENTS

| | | | |
|---|---|---|---|
| 6,134,130 A * | 10/2000 | Connell et al. | 363/89 |
| 6,487,100 B2 * | 11/2002 | Watanabe et al. | 363/127 |
| 6,831,378 B2 * | 12/2004 | Watanabe et al. | 307/149 |
| 2008/0259665 A1 * | 10/2008 | Brederlow et al. | 363/127 |

* cited by examiner

*Primary Examiner*—Rajnikant B Patel
(74) *Attorney, Agent, or Firm*—Dickstein, Shapiro, LLP.

(57) ABSTRACT

A circuit having a first input and a second input configured to apply an alternating voltage, a first output and a second output configured to supply a rectified and regulated voltage, a rectifier bridge circuit having a current return circuit, a third transistor and a fourth transistor, and a controller configured to regulate the voltage between the first and the second output to a constant value. The current return circuit is connected to the first input, the second input and to the second output. The third transistor is configured as a series voltage regulator and is connected to the first input and the first output. The fourth transistor is configured as a series voltage regulator and is connected to the second input and the first output. The controller is coupled to a control input of the third transistor and to a control input of the fourth transistor. Further, a method for rectifying and regulating voltages of a circuit is provided. The circuit and the method can be used in a contactless chip card.

25 Claims, 6 Drawing Sheets

CIRCUIT AND METHOD FOR RECTIFYING AND REGULATING VOLTAGES

FIELD OF THE INVENTION

The invention relates to a circuit comprising a first and a second input for applying an alternating voltage, a first and a second output for supplying a rectified and regulated voltage and a rectifier bridge circuit with a current return circuit, a third, and a fourth transistor and comprising a controller for regulating the voltage between the first and the second output to a constant value. The invention further relates to a method for rectifying and regulating voltages of a circuit, the circuit comprising a first input and a second input at which an alternating voltage can be applied and a first output and a second output at which a rectified and regulated voltage can be tapped of. The circuit and the method are used in a contactless chip card.

BACKGROUND OF THE INVENTION

Contactless chip cards communicate without using electrical connections to reading and writing terminals. In passive chip cards, the power required for communication and for data processing is provided by the terminal in the form of an electromagnetic field by means of a terminal antenna. The electromagnetic field is coupled to the chip card by means of an antenna on the chip card.

Figure 1:
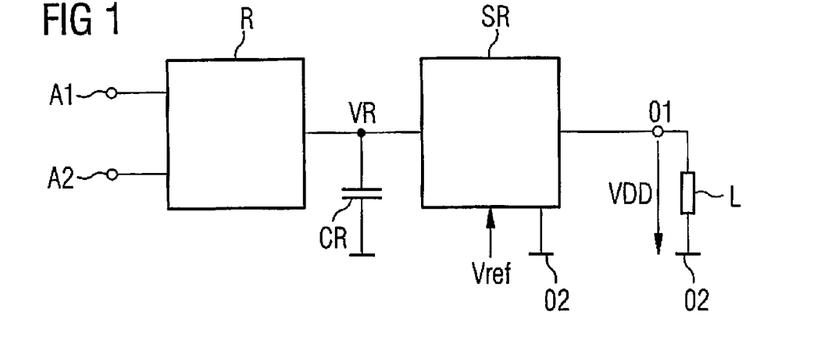
FIG. 1 shows a conventional regulated rectifier circuit.

FIG. 1 shows a conventional rectifier and voltage regulator circuit. The voltage induced in a chip card antenna is applied at a first input A1 and a second input A2 and is rectified by a rectifier R. The rectified voltage VR is smoothed by means of a reservoir capacitor CR. A series voltage regulator SR is used to regulate the output voltage VDD for an electric chip L of the chip card.

Usually, load modulation is used for transmitting data from the chip card to the terminal by changing the electrical load on the chip card antenna in a way that depends on the data that is to be transmitted. Since the chip card antenna is coupled to the terminal antenna by means of an electromagnetic field, these load changes also affect the voltage at the terminal antenna. The resultant voltage changes correspond to the transmitted data and can be demodulated to obtain the transmitted data.

A challenge in producing contactless chip cards is to reduce their cost and to improve their technical performance characteristics.

BRIEF DESCRIPTION OF THE DRAWINGS

The invention is explained in more detail below using exemplary embodiments and with the aid of the figures.

DETAILED DESCRIPTION OF THE INVENTION

The invention provides a circuit, comprising a first input and a second input configured to apply an alternating voltage, a first output and a second output configured to supply a rectified and regulated voltage, a rectifier bridge circuit comprising a current return circuit, a third transistor and a fourth transistor, and comprising a controller configured to regulate the voltage between the first and the second output to a constant value. The current return circuit is coupled to the first input, the second input and to the second output. The third transistor is configured as series voltage regulator and is coupled to the first input and the first output. The fourth transistor is configured as series voltage regulator and is coupled to the second input and the first output. The controller is coupled to a control input of the third transistor and to a control input of the fourth transistor.

The controller supplies voltages to the gates of the third and fourth transistor in order to rectify and regulate the voltage and to prevent backflow of electrical energy from the output to the input. As the rectifying and the voltage regulating function are integrated into third and fourth transistors of this circuit, no further voltage regulating devices are needed. The number of components and the chip area required for the circuit are reduced, leading to lower costs.

In an embodiment, the controller is coupled to the first input, the second input, the first output and the second output. The controller uses the voltages at the inputs and at the outputs to generate control signals for the third and the fourth transistor in order to regulate the output voltage to a constant value. It is further configured to prevent a backflow and a short circuit of current.

In an embodiment, the controller comprises a feedback loop. If the output voltage is too low, the third and fourth transistors are supplied with control signals that lead to greater conductance of the transistors during each respective half-wave. If the output voltage is too high, the controller applies control signals to the third and fourth transistors which reduce their conductance during each respective half-wave.

In an embodiment, the feedback loop comprises a differential amplifier, a voltage divider and a reference voltage. The voltage divider is used to match the output voltage of the circuit to the reference voltage. Both voltages are used as inputs for the differential amplifier which produces an output that depends on the difference between the voltage provided by the voltage provider and the reference voltage.

In an embodiment, the controller comprises a fifth and a sixth transistor. The controller is coupled to a control input of the fifth and of a sixth transistor instead of being coupled to the control input of the third and the fourth transistors, respectively. The fifth transistor is coupled to the first input and to the control input of the third transistor, and the sixth transistor is coupled to the second input and to the control input of the fourth transistor.

The fifth and the sixth transistors are used to amplify the control signals for the third and the fourth transistors.

In an embodiment, the current return circuit comprises a first transistor and a second transistor coupled between the first input and the second output and coupled between the second input and the second output, respectively. The first and the second transistors are switched to complete a current return path for the positive and the negative halfwave of the alternating current.

In an embodiment, a control input of the first transistor is coupled to the second input and a control input of the second transistor is coupled to the first input. The first and the second transistor function as switches which are controlled by the polarities of the voltage at the first and the second input.

In an embodiment, a control input of the first transistor is coupled to the first input and a control input of the second transistor is coupled to the second input. The first and the second transistors are configured to act as diodes, passing positive and negative half-waves of voltages applied between the first and the second input, respectively.

In an embodiment, the current return circuit comprises a first diode and a second diode coupled between the first input and the second output and coupled between the second input and the second output, respectively.

In an embodiment, the current return circuit comprises a first capacitor and a second capacitor coupled between the first input and the second output and coupled between the second input and the second output, respectively.

In an embodiment, the first output and the second output are directly coupled to the electronic chip without a series voltage regulator connecting the circuit and the electronic chip. Since the circuit combines the functions of a rectifier with those of a series voltage regulator, no additional series regulator is required between the circuit and the electronic chip for voltage regulation. Further, no reservoir capacitor CR between the rectifier R and the series voltage regulator SR in conventional rectifier and regulating circuits is needed as in the rectifying and voltage regulating function have been integrated into one circuit. The elimination of this reservoir capacitor CR and of a separate series voltage regulator SR reduces the chip space and the cost of the circuit.

In an embodiment, the circuit further comprises an antenna having an input receiving electromagnetic energy and outputs coupled to the first input and the second input, respectively. The antenna is used to receive an electromagnetic wave as input and converts it into an alternating voltage. The circuit together with the electronic chip and the antenna can be used, for example, in a contactless chip card in which the antenna supplies power and is used for data communication.

In an embodiment, the circuit further comprises a shunt element coupled to the first input and the second input. The shunt element is used to protect the circuit from damages due to overvoltage.

In an embodiment, the circuit further comprises a card body on which the rectifier, the controller, the electronic chip and the antenna and the shunt element are positioned in order to form a contactless chip card.

The invention further provides a method for rectifying and regulating voltages of a circuit, the circuit comprising a first input and a second input at which an alternating voltage can be applied, and a first output and a second output at which a rectified and regulated voltage can be tapped of. The method comprises providing an alternating voltage between a first input and a second input and depending on the polarity of the alternating voltage operating either a third transistor as a series voltage regulator or operating a fourth transistor as a series voltage regulator, in order to rectify and to regulate the voltage between the first output and the second output. In this method, the third and fourth transistors rectify and regulate the output voltage of the circuit.

In an embodiment, control voltages are applied to the third transistor and the fourth transistor by a controller, wherein the control voltages are chosen by the controller so that a voltage of a constant value is output between the first output and the second output.

In an embodiment, the control voltages applied by the controller to the third and the fourth transistors depend on the voltage between the first input and the second input and depend on the voltage between the first output and the second output.

In an embodiment, the same control voltage is applied to the third transistor and the fourth transistor.

In an embodiment, different control voltages are applied to the third transistor and the fourth transistor. Applying different control voltages is useful if the alternating voltage has a DC component.

In an embodiment, the current path is completed by transistors which have their control inputs coupled to the first input or coupled to the second input.

In an embodiment, the current path is completed by diodes.

In an embodiment, the current path is completed by a capacitive voltage divider.

In an embodiment, the first output and the second output are coupled to an electric chip without further voltage regulation.

In an embodiment, providing an alternating voltage comprises receiving electromagnetic energy at an antenna and inducing an alternating voltage between the first input and the second input coupled to opposite ends of the antenna.

In an embodiment, the method is used for operating a contactless chip card.

Figure 2:
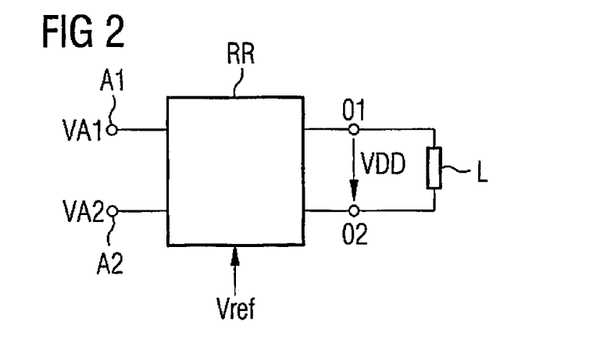
FIG. 2 shows an embodiment of an integrated regulated rectifier circuit.

FIG. 2 shows an embodiment of an integrated regulated rectifier circuit RR. An alternating voltage VA1, VA2 is applied between the first input A1 and the second input A2. A rectified and regulated voltage VDD is output between the first output O1 and the second output O2 and can be used for operating a load L. The circuit RR has a reference voltage input for applying a reference voltage Vref which is used for regulating the output voltage VDD. Comparing FIG. 2 with FIG. 1 shows that the rectifying function of the rectifier R and the regulating function of the series voltage regulator SR are integrated into one circuit RR. Further, the reservoir capacitor CR is eliminated.

Figure 3:
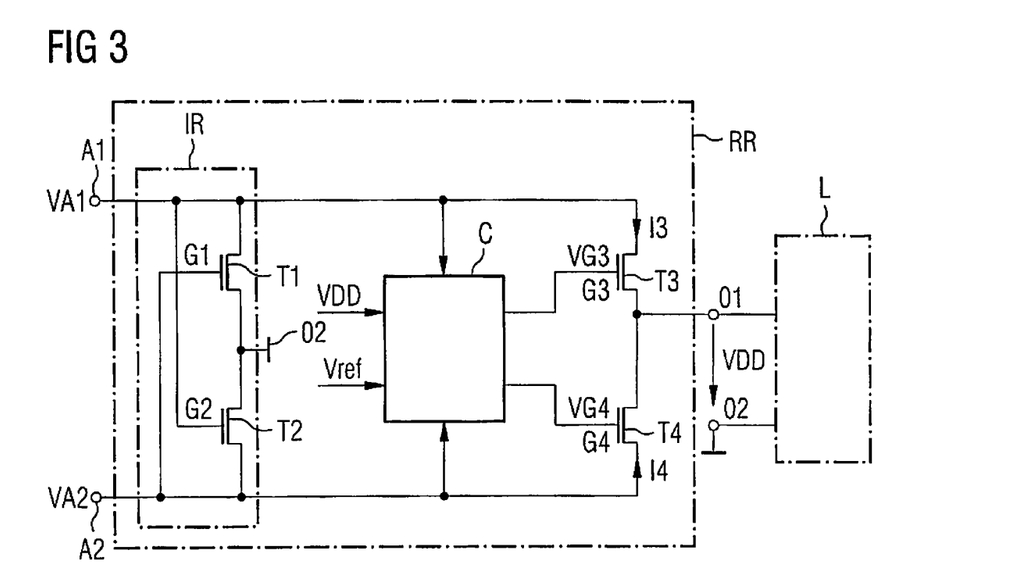
FIG. 3 shows a first embodiment of an integrated regulated rectifier circuit.

FIG. 3 shows a first embodiment of the integrated regulated rectifier circuit RR with a current return circuit IR, a third transistor T3, a fourth transistor T4 and a controller C. The current return circuit IR comprises a first transistor T1 and a second transistor T2. The first transistor T1 is connected to the first input A1 and the second output O2 and has a control input G1 which is connected to the second input A2. The second transistor T2 is connected to the second input A2 and to the second output O2 and has a control input G2 which is connected to the first input A1. The third transistor T3 is connected to the first input A1 and the first output O1 and has a control input G3 which is connected to a controller C. The fourth transistor T4 is connected to the second input A2 and the first output O1 and has a control input G4 which is connected to the controller C. The controller C is connected to the first input A1, the second input A2 and has inputs for a reference voltage Vref and for the output voltage VDD. It provides control voltages VG3 and VG4 for the control inputs G3 and G4 of the third transistor T3 and the fourth transistor T4.

The operation of the circuit shown in FIG. 3 is as follows: if the voltage VA1 applied at the first input A1 is greater than the voltage VA2 applied at the second input A2 (VA1>VA2), a current I3 will flow from the first input A1 through the third transistor T3 to the first output O1 and through the load L. It will leave the load L at the second output O2 and continues to flow through the second transistor T2 of the current return circuit IR to the second input A2. If the voltage VA2 applied at the second input A2 is greater than the voltage VA1 applied at the first input A1 (VA2>VA1), a current I4 flows from the second input A2 through the fourth transistor T4 to the first output O1 where it enters the load L. It leaves the load L at the second output O2 and continues flowing through the first transistor T1 of the current return circuit IR to the first input A1. The circuit RR acts as a rectifier as the current always flows through the load L in the same direction, regardless of the polarity of the voltage applied between the inputs A1 and A2. The output voltage VDD is further regulated by applying control voltages VG3 and VG4 to the third and fourth transistors T3 and T4 in order to operate them as series voltage regulators.

Figure 4:
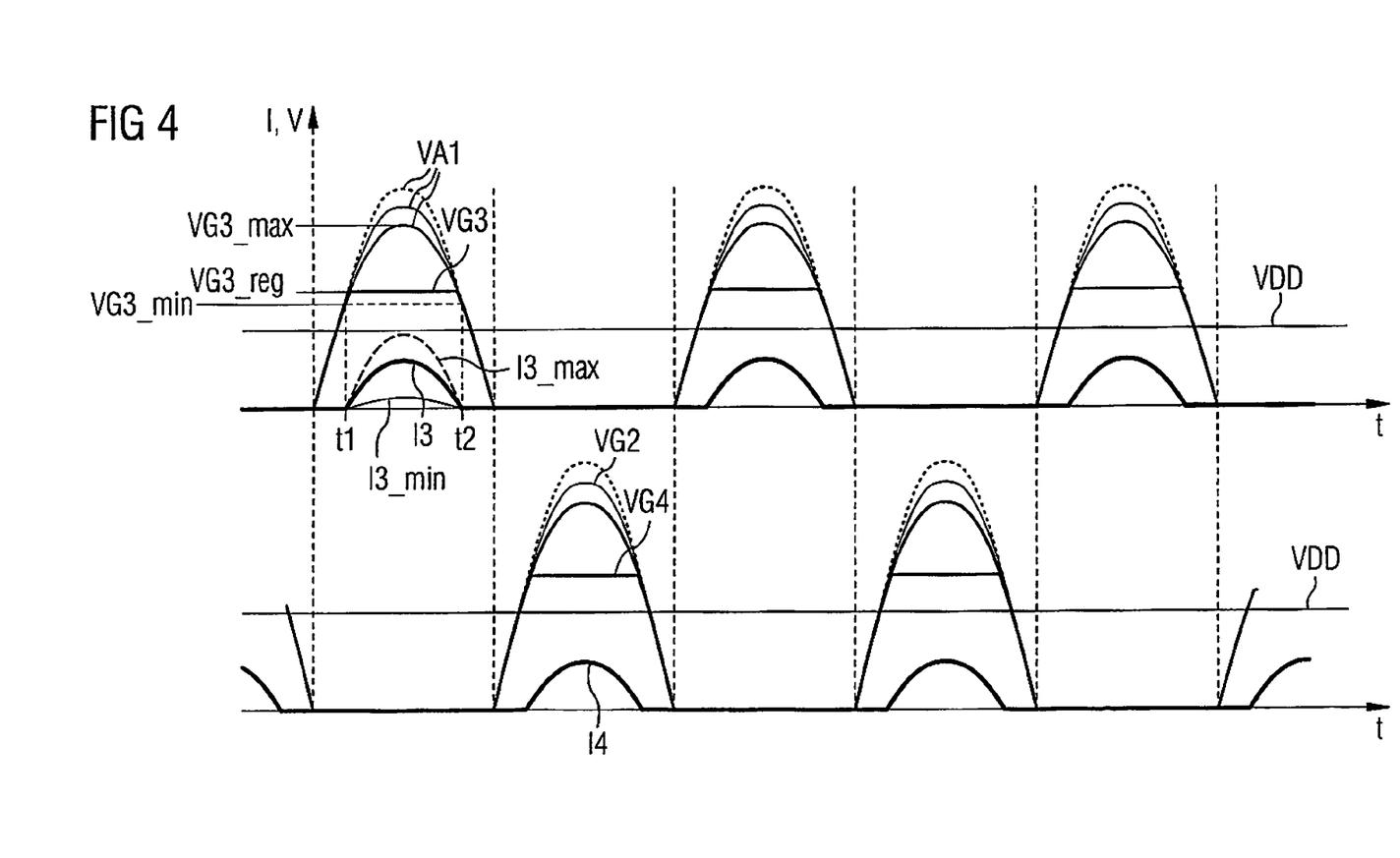
FIG. 4 shows current and voltage waveforms of the first embodiment.

FIG. 4 shows waveforms of currents and voltages which occur when operating the circuit shown in FIG. 3. The upper part of FIG. 4 shows waveforms when the voltage VA1 is positive with respect to the voltage VA2 (VA1>VA2), while the lower part shows waveforms when the voltage VA2 is positive with respect to VA1 (VA2>VA1).

When VA1 is positive with respect to VA2 (VA1>VA2), the second transistor T2 and the third transistor T3 conduct so that there is a current I3 flowing. The first transistor T1 and the fourth transistor T4 are non-conducting as one is in an off-state while the other has a control voltage VG4 applied to its control input G4 so that the current through it is I4=0.

For conduction of the third transistor T3, a positive voltage VG3 with respect to the output O1 has to be applied to its control input G3. The voltage VG3 is output by the controller C which adjusts the voltage VG3 in such a way that a desired output voltage VDD is reached. The control voltage VG3 can for example follow the voltage VA1 at the first input A1, with the third transistor T3 conducting when VG3=VG3_min is greater than the output voltage VDD plus a threshold voltage Vth of the third transistor T3. Conduction starts at time t1 and continues until time t2 when the control voltage VG3 falls below VG3_min.

If VG3 is equal to VG3_min, the third transistor T3 is just conducting and the minimum current corresponds to the lower dotted current curve I3_min shown. If the control voltage VG3 for the third transistor T3 is VG3_reg, that is it is between the voltage VG3_min and a maximum voltage VG3_max, the transistor T3 is acting as a series voltage regulator and the current I3 that flows lies between the minimum current I3_min and a maximum current I3_max. The voltage VG3_reg of the control voltage VG3 is thus used for regulating the output voltage VDD. The gate-source capacitance of the third transistor T3 is then partially charged. If the control voltage VG3 has a maximum value of VG3_max which corresponds to the maximum of the voltage VA1, the third transistor T3 is fully conducting and basically behaves like a diode. The upper dotted current curve shows the current I3_max flowing in this case and the gate-source capacitance of the third transistor T3 is fully charged.

The waveform of the current I3 is determined by the voltage VA1 and the type of load L. If the load L is resistive, I3 is proportional to the voltage VA1 at the first input A1 when the third transistor T3 is conducting. The waveform of the output voltage VDD shown in FIG. 4 is constant, indicating that the load L has a capacitive component.

In case that voltage VA2 at the second input A2 is greater than the voltage VA1 at the first input A1 (VA2>VA1), a current I4 flows through the fourth transistor T4 and the first transistor T1 while no current I3 flows through the third transistor T3 and the second transistor T2. The same operating principle as described above applies where VA1, VG3 and I3 are replaced by VA2, VG4 and I4 and the transistors T2 and T3 are replaced by the transistors T1 and T4.

FIG. 3 uses NMOS transistors. However, other conventional transistors and other series regulating elements can be used. Further, different embodiments of the current return circuit IR, such as are described for example in connection with FIG. 8a, 8b and 8c can be used. The above variations are also to be applied to the other embodiments of the circuit RR described in this document.

Figure 5:
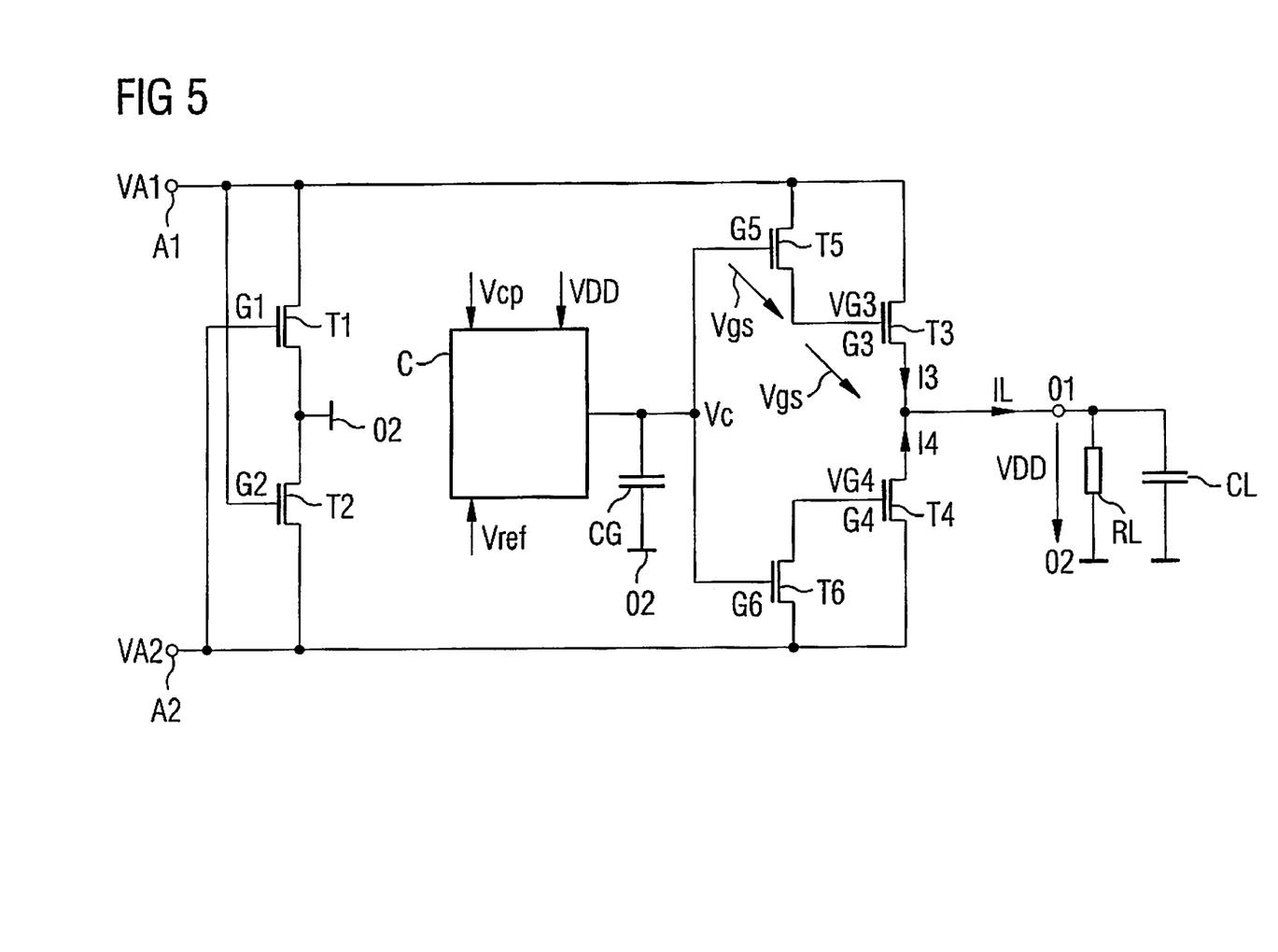
FIG. 5 shows a second embodiment of an integrated regulated rectifier circuit.

FIG. 5 shows a second embodiment of the integrated regulated rectifier circuit RR. The circuit shown in FIG. 5 operates according to the same principle as described in FIGS. 2 to 4. In contrast to FIG. 3, the control input G3 of the third transistor T3 and the control input G4 of the transistor T4 are connected to a fifth transistor T5 and a sixth transistor T6, respectively. The fifth and sixth transistors T5 and T6 can be regarded as part of the controller C and control the voltages VG3 and VG4 of the third and fourth transistors T3 and T4. The same control voltage Vc is applied to the fifth transistor T5 and the sixth transistor T6 and is connected to the second output O2 by means of a control voltage capacitor CG in order to stabilize it. The output voltage VDD is given by VDD=Vc−2*Vgs, assuming that the transistors T3, T5 and T4, T6 have the same Vgs. The control circuit C therefore has to have a voltage Vcp available that is higher than VDD. Such a voltage may be supplied externally to the controller C by an input or created internally by means of a high voltage producer, such as a charge pump.

Figure 6:
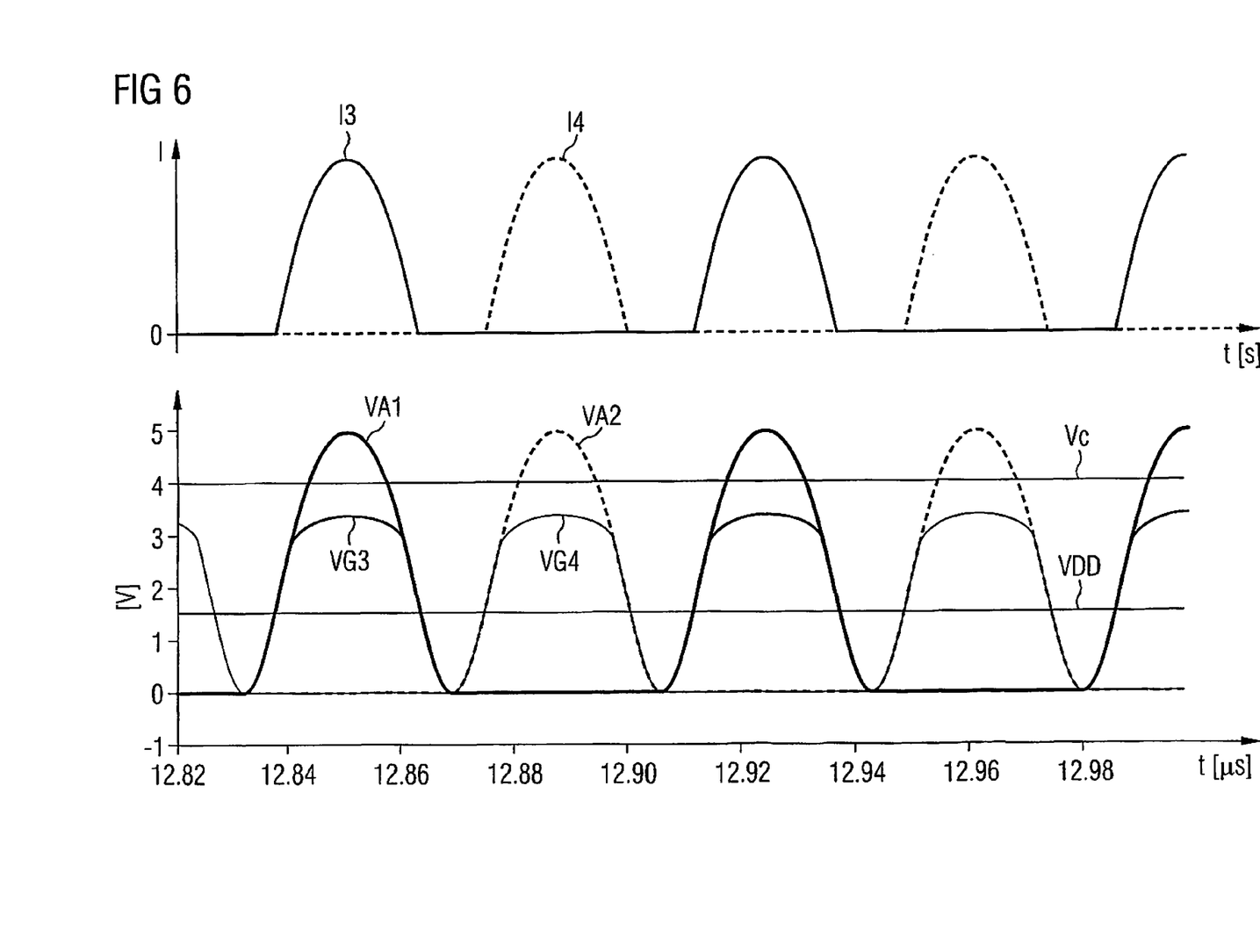
FIG. 6 shows current and voltage waveforms of the second embodiment.

FIG. 6 shows currents and voltage waveforms of the second embodiment shown in FIG. 5. The top half shows the currents I3 and I4 which flow through the third and fourth transistors T3 and T4, respectively, while the bottom half shows the input voltages VA1, VA2, the control voltage Vc, the output voltage VDD and the control voltages VG3, VG4 of the third and fourth transistors T3, T4.

If the first input voltage VA1 is less than the output voltage VDD, the fifth transistor T5 conducts and connects the control input G3 of the third transistor T3 with the first input voltage VA1. The third transistor T3 is configured to act as a diode and prevents a flow of current I3 from the output to the input of the circuit. The third transistor T3 started conducting when the first input voltage VA1 is greater than the output voltage VDD. The current flow I3 leads to an increase in the output voltage VDD and the control voltage VG3 of the third transistor T3 will continue to be approximately equal to the first input voltage VA1. With the increase in the output voltage VDD the fifth transistor T5 will no longer be fully conducting and has a voltage drop which causes the control input voltage VG3 of the third transistor T3 to be lower than the first input voltage VA1. The reduction in control input voltage VG3 of the third transistor T3 limits the current I3 flowing through the third transistor T3 until the condition VDD=Vc−2*Vgs is reached. The same operation as described above also applies to voltages VA2, VG4 and the current I4 with the transistors T3 and T5 being replaced by the transistors T4 and T6.

Figure 7:
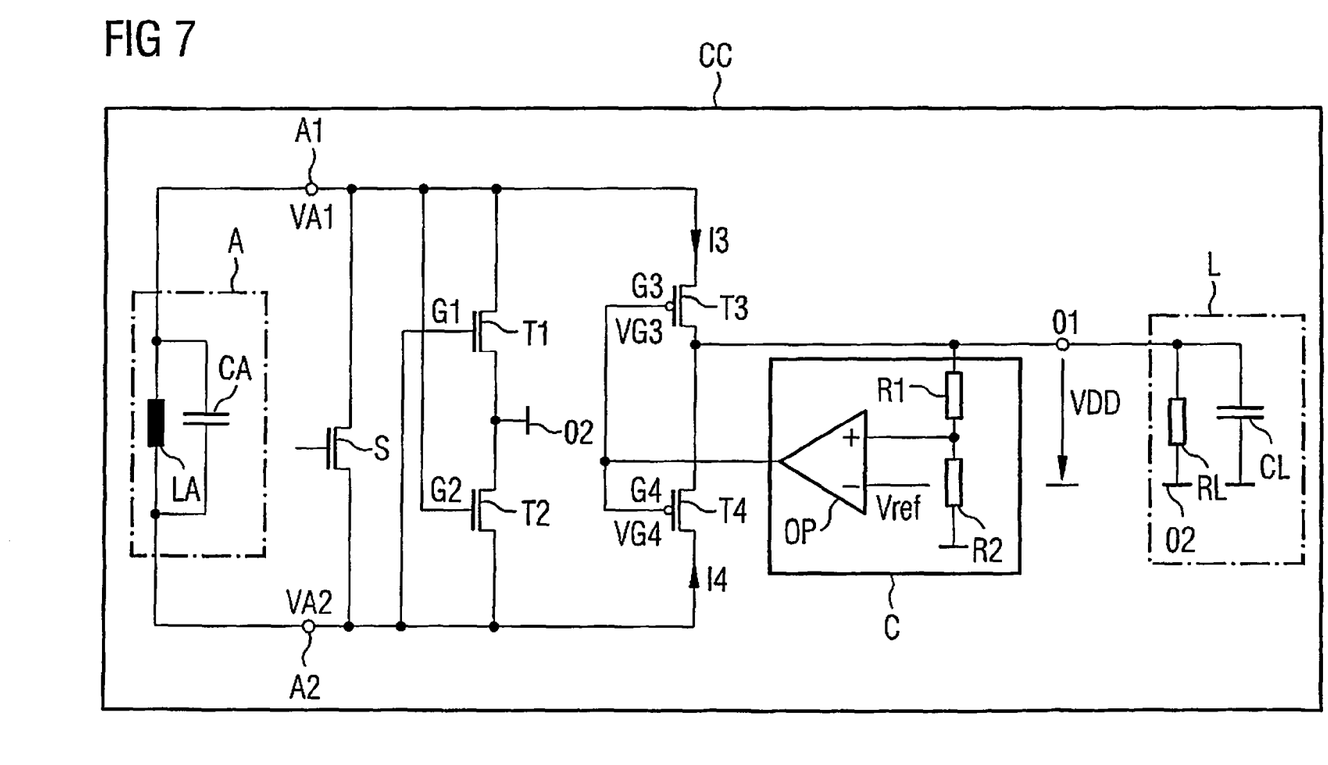
FIG. 7 shows an embodiment of a contactless chip card using a third embodiment of an integrated regulated rectifier circuit.

FIG. 7 shows a third embodiment of the integrated regulated rectifier circuit RR and an embodiment of a contactless chip card. The circuit shown in FIG. 7 operates according to the same principle as described in FIGS. 2 to 6. However, there are some differences. The third transistor T3 and the fourth transistor T4 are PMOS transistors so that no charge pump is required for operating these transistors.

FIG. 7 also shows an embodiment of a controller used for feedback regulating the output voltage VDD. The controller C comprises a differential amplifier OP, a voltage divider with the resistors R1 and R2 and a voltage reference Vref. The voltage divider is chosen so that the output voltage VDD corresponds to the reference voltage Vref. The output of the voltage divider is connected to a positive input while the reference voltage Vref is connected to a negative input of the differential amplifier OP. If the output voltage VDD is too large, the differential amplifier OP will output a high signal which acts as a control voltage for the control voltages VG3 and VG4 for the third and fourth transistor T3 and T4. With a high signal at the control inputs G3 and G4, the PMOS transistors become less-conductive so that there is a higher voltage across them, resulting in a reduction of the output voltage VDD. If the output voltage VDD is too small, the differential amplifier OP outputs a low level signal which causes the transistors T3 and T4 to conduct more current. The reduction in the voltage drop across the transistor T3 and T4 leads to an increase of the output voltage VDD at the output O1.

FIG. 7 further shows an embodiment of an antenna A that comprises a coil with an inductance LA and a resonance capacitor CA connected in parallel to the coil. The capacitance CA is chosen so that the parallel resonance circuit has a resonance frequency that corresponds to the frequency used by the reading and writing terminal. A common frequency is for example 13.56 MHz. At resonance, the induced voltage between the inputs A1 and A2 reaches a maximum.

The voltage induced between the inputs A1 and A2 depends on the coupling factor of the terminal antenna and the chip antenna A. The different induced voltages are shown in FIG. 4 by dotted lines of the maximum values of the voltages VA1 and VA2. At long distances between the chip card and the terminal, the coupling is weak and only low voltages are induced. However, at short distances, the induced voltages can easily reach high levels which can damage the transistors and the chip as a result of overvoltage. To protect the chip against overvoltage, a shunt element S which is connected to the first and second input A1 and A2 is used. If the voltage induced between the inputs A1 and A2 is too high, the shunt element shorts the inputs. Of course, the embodiments shown can also be used to rectify and regulate alternating voltages which are produced by means other than an antenna.

FIG. 7 further shows a load L that has a resistive part RL and a capacitive part CL. The capacitive part CL additionally smoothes the regulated output voltage VDD. The antenna, the rectifying circuit with the controller C and the load L are arranged in a card body to form a contactless chip card CC, which can also be constructed by using any of the other embodiments.

FIGS. 8A to 8E show five different embodiments of the current return circuit IR which can be used in conjunction with all the embodiments. The current return circuit IR is used to complete the current path for both positive and negative voltages between the first and the second inputs A1 and A2 without causing a short circuit at the inputs A1 and A2. Another function of the current return circuits IR is to provide a ground for the integrated regulated rectifier circuit RR. Further embodiments of the current return circuit IR, such as a single-ended integrated regulator rectifier circuit RR are also possible.

Figure 8A:
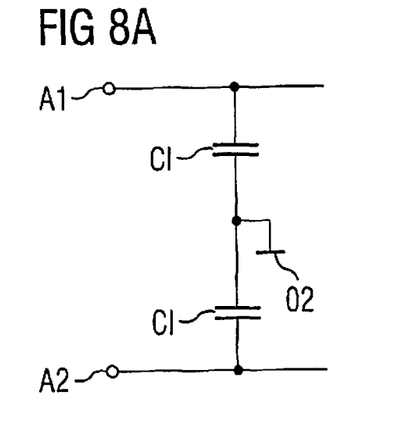
FIGS. 8A to 8E show embodiments of current return circuits.

FIG. 8A shows a current return circuit IR with a capacitive voltage divider, where a current return capacitor CI is connected to the first input A1 and the second output O2 and another current return capacitor CI is connected to the second input A2 and the second output O2.

Figure 8B:
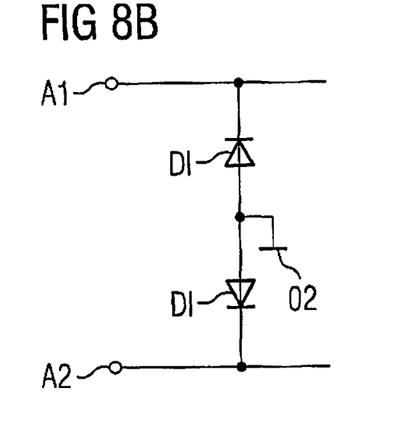

FIG. 8B shows a current return circuit IR where two current return diodes DI are connected to the first input A1 and the second output O2 and connected to the second input A2 and the second output O2, respectively.

Figure 8C:
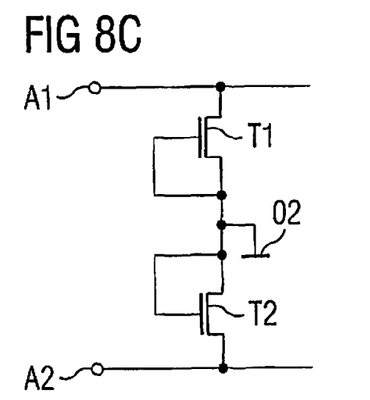

FIG. 8C shows a current return circuit IR where a first transistor T1 and a second transistor T2 are connected to the first input A1 and the second output O2 and connected to the second input A2 and the second output O2, respectively. The control inputs G of the first transistor T1 and of the second transistor T2 are connected to the second input A2, causing them to act as diodes. The transistors T1 and T2 are NMOS transistors.

Figure 8D:
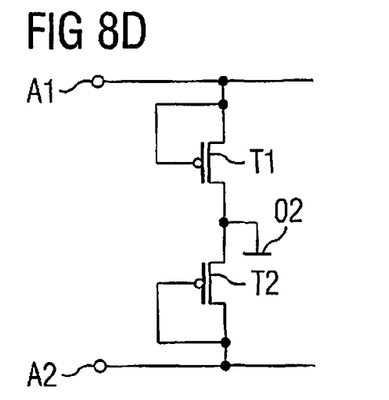

FIG. 8D shows a current return circuit IR where a first transistor T1 and a second transistor T2 are connected to the first input A1 and the second output O2 and connected to the second input A2 and the second output O2, respectively. The control input G of the first transistor T1 is connected to the first input A1 and the control input G of the second transistor T2 is connected to the second input A2, causing them to act as diodes. The transistors T1 and T2 are PMOS transistors.

Figure 8E:
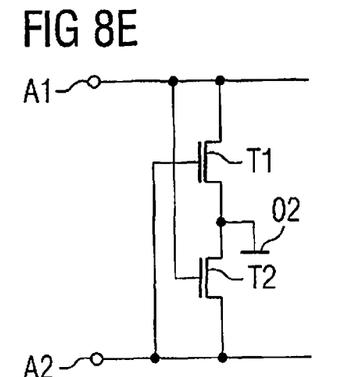

FIG. 8E shows a current return circuit IR where a first transistor T1 and a second transistor T2 are connected to the first input A1 and the second output O2 and connected to the second input A2 and the second output O2, respectively. The control input G of the first transistor T1 is connected to the second input A2 and the control input G of the second transistor T2 is connected to the first input A1. The transistors T1 and T2 conduct and insulate depending on the polarity between the first input A1 and the second input A2.

The embodiments of the integrated regulated rectifier circuit RR described have several advantages over a conventional rectifier system having a full wave rectifier R, a reservoir capacitor CR and a separate series voltage regulator SR. Firstly, the chip area required for the circuit is reduced as no reservoir capacitor between the rectifier R and the series voltage regulator SR and no extra series voltage regulator are required. The extra series voltage regulator is not needed as its function is already performed by the third transistor T3 and the fourth transistor T4, which also act as rectifying elements. The load L can therefore be directly connected to the integrated regulator rectifier circuit RR.

Secondly, the embodiments have a higher efficiency due to lower voltage drops. In a conventional full wave rectifier R with a separate series voltage regulator SR, a voltage drop across the rectifier R and across the series voltage regulator SR occurs. In contrast to that the integrated regulator rectifier RR does not have a voltage drop across an extra series voltage regulator SR. The lower voltage drop results in a higher output voltage VDD for the same voltage applied at the inputs A1 and A2, or that a lower voltage can be applied at the inputs A1 and A2 to obtain the same output voltage VDD. In practice this means that if the integrated regulator rectifier RR is used in a contactless chip card, the chip card can be operated further away from the terminal. Further, if several contactless chip cards are grouped together, the extra available voltage guarantees that enough load modulation is available to avoid interference between the cards. The reduced interference between cards allows more chip cards to be grouped together, increasing the performance of the data communication system consisting of the terminal and the chip cards.

Thirdly, the use of the third transistor T3 and the fourth transistor T4 as series voltage regulators reduces the coupling of disturbances from the input A1 and A2 to the output O1 and O2 and vice-versa. Disturbances in the electromagnetic field or surges in the current consumed by the load L are therefore less likely to be interpreted as false load modulation and will not lead to the interpretation of false data.

Fourthly, the efficiency of the circuit RR is still further improved as the gate-source capacitances of the series voltage regulator transistors T3 and T4 do not need to be fully charged and discharged during every half cycle of the alternating voltage. In a conventional full bridge rectifier two rectifying elements are fully turned on and fully turned off during each half cycle. For this charges must flow into the gate-source capacitances of the transistors or into the pn-junctions if diodes are used and out again at the frequency of the alternating voltage, which may for example be 13.56 MHz. In contrast to that, only the element in the current return circuit IR of the invention is fully turned on and off while the series voltage regulator transistors are usually operated in a partially conducting manner, requiring less charging and discharging of the associated gate-source capacitances during voltage regulation. The increased efficiency can increase the reading distance and allows as reduction in size and rating of the power path components of a chip card.

What is claimed is:

1. A circuit, comprising:
a first input and a second input configured to apply an alternating voltage;
a first output and a second output configured to supply a rectified and regulated voltage;
a rectifier bridge circuit comprising a current return circuit, a third transistor and a fourth transistor, wherein:
the current return circuit is coupled to the first input, the second input and to the second output,
the third transistor is configured as a series voltage regulator and is coupled to the first input and the first output, and
the fourth transistor is configured as series voltage regulator and is connected to the second input and the first output; and
a controller configured to regulate the voltage between the first and the second output to a constant value, wherein the controller is coupled to a control input of the third transistor and to a control input of the fourth transistor.

2. The circuit of claim 1, wherein the controller is coupled to the first input, to the second input, to the first output, and to the second output.

3. The circuit of claim 2, wherein the controller comprises a feedback loop.

4. The circuit of claim 3, wherein the feedback loop comprises a differential amplifier, a voltage divider, and a reference voltage.

5. A circuit, comprising:
a first input and a second input configured to apply an alternating voltage;
a first output and a second output configured to supply a rectified and regulated voltage;
a rectifier bridge circuit comprising a current return circuit, a third transistor and a fourth transistor, wherein:
the current return circuit is coupled to the first input, the second input and to the second output,
the third transistor is configured as a series voltage regulator and is coupled to the first input and the first output, and
the fourth transistor is configured as series voltage regulator and is connected to the second input and the first output; and
a controller configured to regulate the voltage between the first and the second output to a constant value, wherein the controller comprises a fifth and a sixth transistor, is coupled to a control input of the fifth and of a sixth transistor, respectively, the fifth transistor is coupled to the first input and to the control input of the third transistor, and the sixth transistor is coupled to the second input and to the control input of the fourth transistor.

6. The circuit of claim 1, wherein the current return circuit comprises a first transistor and a second transistor coupled between the first input and the second output and coupled between the second input and the second output, respectively.

7. The circuit of claim 6, wherein a control input of the first transistor is coupled to the second input and a control input of the second transistor is coupled to the first input.

8. The circuit of claim 6, wherein a control input of the first transistor is coupled to the first input and a control input of the second transistor is coupled to the second input.

9. The circuit of claim 1, wherein the current return circuit comprises a first diode and a second diode coupled between the first input and the second output and coupled between the second input and the second output, respectively.

10. The circuit of claim 1, wherein the current return circuit comprises a first capacitor and a second capacitor coupled between the first input and the second output and coupled between the second input and the second output, respectively.

11. The circuit of one claim 1, wherein the first output and the second output are directly coupled to the electronic chip without a series voltage regulator connecting the circuit and the electronic chip.

12. The circuit of claim 11, further comprising an antenna having an input configured to receive electromagnetic energy and outputs coupled to the first input and the second input, respectively.

13. The circuit of claim 12, further comprising a shunt element coupled to the first input and the second input.

14. The circuit of claim 13, further comprising a card body on which the rectifier, the controller, the electronic chip, the antenna, and the shunt element are positioned in order to form a contactless chip card.

15. A method for rectifying and regulating voltages of a circuit, the circuit comprising a first input and a second input at which an alternating voltage can be applied, and a first output and a second output at which a rectified and regulated voltage can be tapped off, the method comprising:
providing an alternating voltage between a first input and a second input; and
depending on the polarity of the alternating voltage operating either a third transistor as a series voltage regulator or operating a fourth transistor as a series voltage regulator, in order to rectify and to regulate the voltage between the first output and the second output.

16. The method of claim 15, further comprising applying control voltages to the third transistor and the fourth transistors by a controller, wherein the control voltages are chosen by the controller so that a voltage of a constant value is output between the first output and the second output.

17. The method of claim 16, wherein the control voltages applied by the controller to the third transistor and the fourth transistor depend on the voltage between the first input and the second input and depend on the voltage between the first output and the second output.

18. The method of claim 17, wherein the same control voltage is applied to the third transistor and the fourth transistor.

19. The method of claim 17, wherein different control voltages are applied to the third transistor and the fourth transistor.

20. The method of claim 17, further comprising completing the current path by transistors which have their control inputs coupled to the first input or coupled to the second input.

21. The method of claim 17, further comprising completing the current path by diodes.

22. The method of claim 17, further comprising completing the current path by a capacitive voltage divider.

23. The method of one of the claim 17, wherein the first output and the second output are coupled to an electric chip without further voltage regulation.

24. The method of claim 23, wherein providing an alternating voltage comprises:
receiving electromagnetic energy at an antenna; and
inducing an alternating voltage between the first input and the second input coupled to opposite ends of the antenna.

25. The method of claim 24, wherein the method is used for operating a contactless chip card.

* * * * *